July 12, 1960 — B. COOPER — 2,944,590
AUXILIARY BICYCLE SEAT
Filed Nov. 24, 1958

Benjamin Cooper
INVENTOR.

United States Patent Office 2,944,590
Patented July 12, 1960

2,944,590

AUXILIARY BICYCLE SEAT

Benjamin Cooper, 15773 Chapel, Detroit, Mich.

Filed Nov. 24, 1958, Ser. No. 776,128

1 Claim. (Cl. 155—5.12)

This invention relates to new and useful improvements in auxiliary or tandem seats particularly for bicycles and has for one of its important objects to provide, in a manner as hereinafter set forth, a device of this character which is adapted to be readily mounted for use on the usual luggage rack or carrier on the rear of the bicycle.

Another important object of the present invention is to provide an auxiliary seat of the aforementioned character which may be firmly but removably secured on a conventional bicycle without the necessity of altering or modifying same structurally.

Other objects of the invention are to provide an auxiliary bicycle seat of the character described which will be comparatively simple in construction, strong, durable, compact, of light weight, comfortable, safe and which may be manufactured at low cost.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

Figure 1:
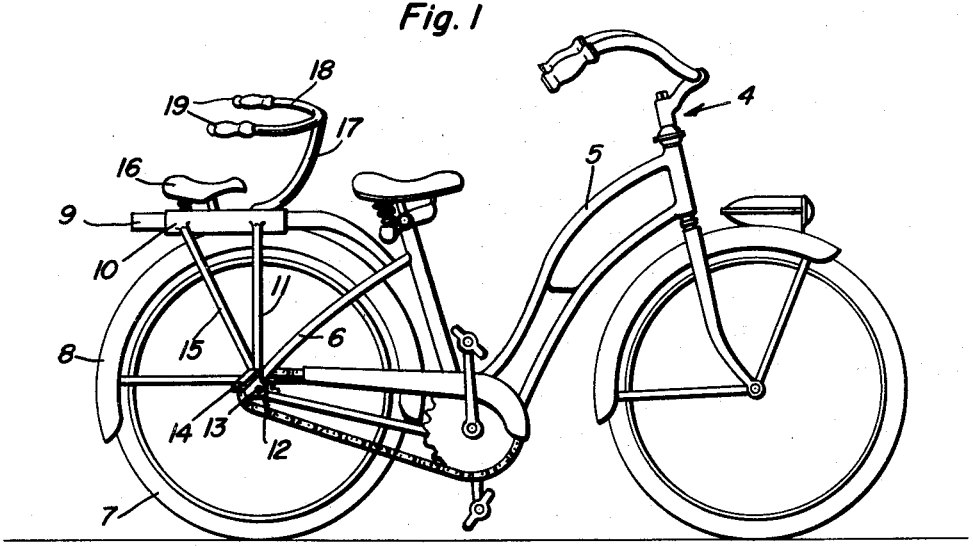
Figure 1 is a view in side elevation of a bicycle equipped with an auxiliary seat constructed in accordance with the present invention.
Figure 3:
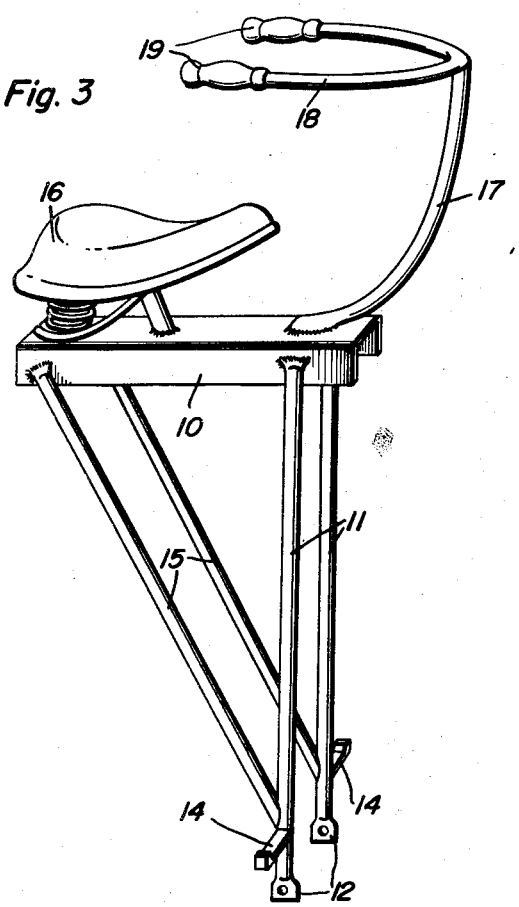
Figure 3 is a perspective view of the device.
Figure 2:
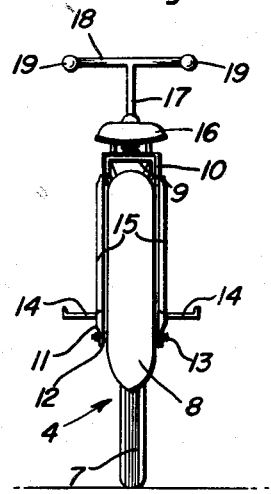
Figure 2 is a view in rear elevation thereof.

Referring now to the drawing in detail, it will be seen that reference character 4 designates generally a conventional bicycle the frame 5 of which includes a rear fork 6 in which the rear wheel 7 is mounted, said wheel 7 being provided with a mud guard 8. Mounted on the fork 6 and the mud guard 8 is a luggage rack or carrier 9.

The embodiment of the present invention which has been illustrated comprises an inverted channel bar or plate 10 of suitable metal which is mounted longitudinally on the luggage rack 9. Toward this end, the channel bar 10 is provided, on its forward end portion, with a pair of depending legs 11 which straddle the wheel 7. The legs 11 terminate in flattened, apertured lower end portions 12 which are secured by the usual nuts on the projecting end portions of the rear axle 13 of the bicycle 4. Foot rests 14 project laterally from the lower portions of the legs 11. Extending between the rear end portion of the channel bar 10 and the lower portions of the legs 11 are metallic braces 15.

Mounted on the rear portion of the channel bar 10 is a saddle 16. Fixed on the forward portion of the channel bar 10 is a forwardly and upwardly curved neck or post 17. Fixed on the upper end of the neck or post 17 is a handle bar 18 which is provided on its end portions with suitable grips 19.

It is thought that the invention will be readily understood from a consideration of the foregoing. Briefly, to mount the device on the bicycle 4, it is only necessary to remove the usual nuts from the rear axle 13 of said bicycle. The inverted channel bar 10 is positioned longitudinally on the luggage rack 9 and the apertured end portions 12 of the legs 11 are engaged with the end portions of the axle 13, after which the aforementioned nuts are replaced and tightened. Of course, the rider occupies the saddle 16 and grasps the grips 19 with his or her feet supported by the rests 14 in an obvious manner. In addition to firmly retaining the channel bar 10 in position, the legs 11 relative the luggage rack or carrier 9 of a considerable portion of the load.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

An auxiliary seat of the character described for a bicycle including a frame, a rear axle on said frame, a rear wheel journaled on said axle and a luggage rack mounted above said wheel, said auxiliary seat comprising: an inverted channel bar mounted longitudinally on the luggage rack, a pair of legs depending from the forward end portion of said channel bar on opposite sides of the wheel, said legs comprising apertured lower end portions secured on the end portions of the axle for securing the channel bar in position on the luggage rack, foot rests on the lower portions of the legs, braces extending between said lower portions of said legs and the rear end portion of the channel bar, a saddle mounted on the rear portion of the channel bar, a post rising from the front portion of said channel bar, and a handle bar fixed on said post.

References Cited in the file of this patent

UNITED STATES PATENTS

| | | |
|---|---|---|
| 936,845 | Adams | Oct. 12, 1909 |
| 1,278,909 | Graf | Sept. 17, 1918 |
| 2,147,361 | Bloomberg | Feb. 14, 1939 |
| 2,320,344 | Belanger | June 1, 1943 |
| 2,723,132 | Oberwegner | Nov. 8, 1955 |